(12) United States Patent
Lehto

(10) Patent No.: US 10,059,883 B2
(45) Date of Patent: Aug. 28, 2018

(54) METHOD FOR PRODUCING A PYROLYSIS PRODUCT

(71) Applicants: TEKNOLOGIAN TUTKIMUSKESKUS VTT, Vtt (FI); VALMET POWER OY, Tampere (FI)

(72) Inventor: Jani Lehto, Jyväskylä (FI)

(73) Assignees: Valmet Technologies Oy, Espoo (FI); Teknologian Tutkimuskeskus VTT Oy, Vtt (FI)

(*) Notice: Subject to any disclaimer, the term of this patent is extended or adjusted under 35 U.S.C. 154(b) by 721 days.

(21) Appl. No.: 14/412,947

(22) PCT Filed: Jul. 5, 2013

(86) PCT No.: PCT/FI2013/050737
§ 371 (c)(1),
(2) Date: Jan. 5, 2015

(87) PCT Pub. No.: WO2014/006273
PCT Pub. Date: Jan. 9, 2014

(65) Prior Publication Data
US 2015/0166895 A1     Jun. 18, 2015

(30) Foreign Application Priority Data

Jul. 6, 2012  (FI) .................................. 20125784

(51) Int. Cl.
*C10B 21/18* (2006.01)
*C10B 27/00* (2006.01)
(Continued)

(52) U.S. Cl.
CPC .............. *C10B 21/18* (2013.01); *C10B 27/00* (2013.01); *C10B 49/22* (2013.01); *C10B 53/02* (2013.01);
(Continued)

(58) Field of Classification Search
CPC .... C10L 321/18; C10L 353/02; C10L 357/06; C10B 49/22; C10B 53/02; C10B 57/06;
(Continued)

(56) References Cited

U.S. PATENT DOCUMENTS 3,853,498 A  * 12/1974  Bailie ..................... C10B 49/22
                                                                    201/12
4,432,290 A     2/1984  Ishii et al.
(Continued)

FOREIGN PATENT DOCUMENTS

WO       02083816 A1    10/2002
WO    2006117824 A1    11/2006
(Continued)

OTHER PUBLICATIONS

Search report from corresponding International Application No. PCT/FI2013/050737, dated Sep. 30, 2013, 3 pgs.
(Continued)

*Primary Examiner* — Renee Robinson
*Assistant Examiner* — Derek N Mueller
(74) *Attorney, Agent, or Firm* — Chernoff, Vilhauer, LLP

(57) ABSTRACT

The invention relates to a method and apparatus for producing a pyrolysis product, in which raw material are fed to the pyrolysis reactor and gaseous pyrolysis product fractions and by-product fractions are formed from raw material by pyrolysis in a pyrolysis reactor. According to the invention the method comprising steps: combusting at least one by-product fraction from the pyrolysis reactor in at least two combustors, and recovering energy formed in the combustor.

3 Claims, 1 Drawing Sheet

(51) Int. Cl.
- *C10B 49/22* (2006.01)
- *C10B 53/02* (2006.01)
- *C10B 57/06* (2006.01)
- *F23G 5/027* (2006.01)
- *F23G 5/00* (2006.01)
- *F23G 5/16* (2006.01)
- *F23G 5/30* (2006.01)
- *F23G 7/10* (2006.01)
- *C10K 1/02* (2006.01)
- *C10K 1/04* (2006.01)

(52) U.S. Cl.
CPC .............. *C10B 57/06* (2013.01); *F23G 5/006* (2013.01); *F23G 5/027* (2013.01); *F23G 5/16* (2013.01); *F23G 5/30* (2013.01); *F23G 7/10* (2013.01); *C10K 1/026* (2013.01); *C10K 1/04* (2013.01); *F23G 2201/303* (2013.01); *F23G 2201/304* (2013.01); *Y02E 50/14* (2013.01)

(58) Field of Classification Search
CPC ... C10B 27/00; C10B 21/18; F23G 2201/303; F23G 2201/304; F23G 5/006; F23G 5/027; F23G 5/16; F23G 5/30; F23G 7/10; Y02E 50/14
See application file for complete search history.

(56) References Cited

U.S. PATENT DOCUMENTS

| 4,541,345 A | 9/1985 | Grumpelt et al. |
| 2011/0132737 A1 | 6/2011 | Jadhav |
| 2013/0068605 A1 | 3/2013 | Rovner |

FOREIGN PATENT DOCUMENTS

| WO | 2009047392 A1 | 4/2009 |
| WO | 2011055010 A1 | 12/2011 |
| WO | 2013043915 A1 | 3/2013 |

OTHER PUBLICATIONS

European Patent Office, Extended European Search Report issued in application No. 138133352.5, dated Apr. 22, 2016, 8 pages, European Patent Office, Munich, Germany.

* cited by examiner

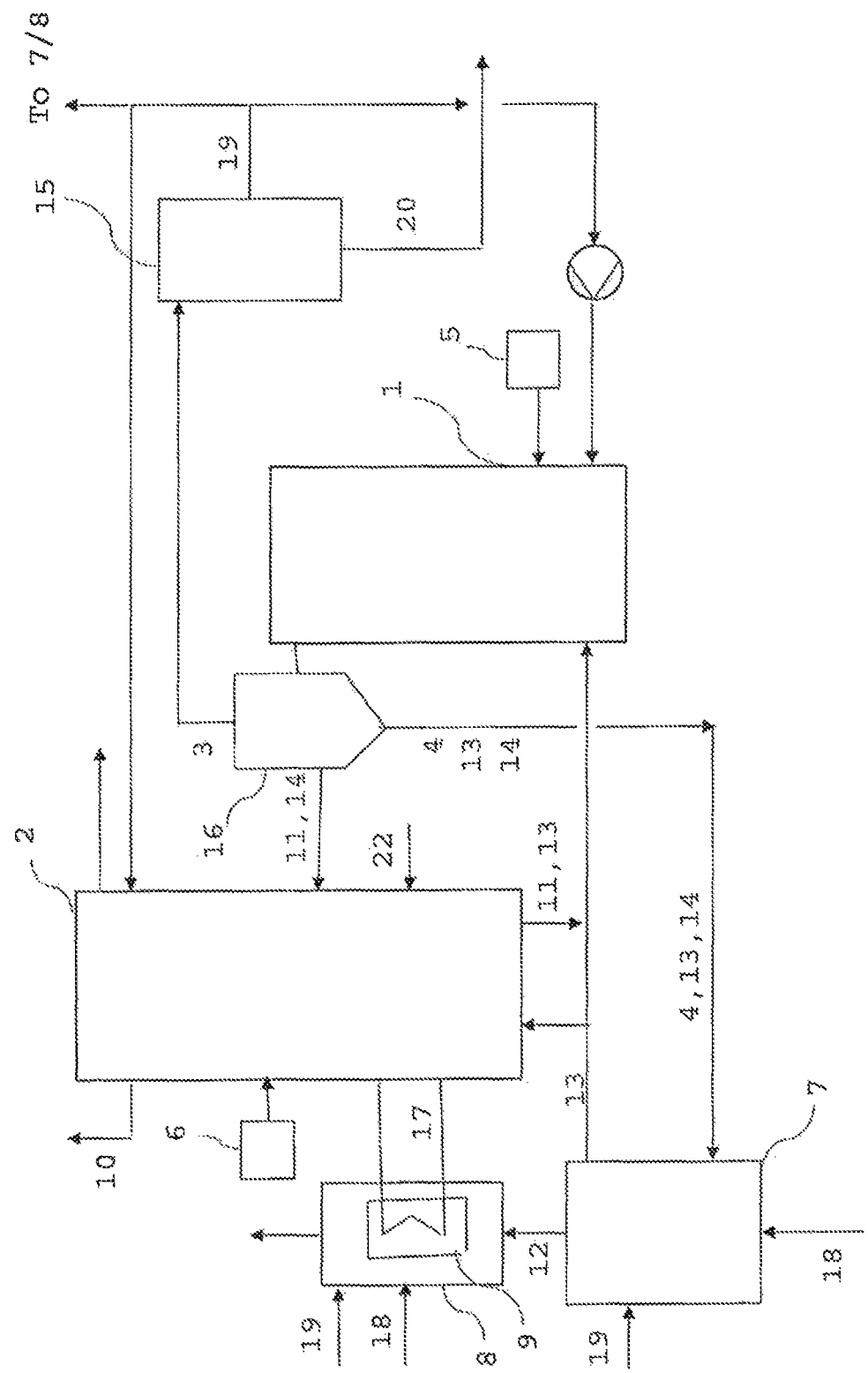

METHOD FOR PRODUCING A PYROLYSIS PRODUCT

This is a national stage application filed under 35 USC 371 based on International Application No. PCT/FI2013/050737 filed Jul. 5, 2013 and claims priority under 35 USC 119 of Finnish Patent Application No. 20125784 filed Jul. 6, 2012.

FIELD OF THE INVENTION

The invention relates to methods and systems for producing a pyrolysis product.

BACKGROUND OF THE INVENTION

It is known from the prior art that a pyrolysis product, i.e. pyrolysis liquid or pyrolysis gas, is produced from different kinds of biomasses or organic materials such as wood, bark, paper, straw, waste plastic, oil shale, lignite, peat or the like by dry distillation with the pyrolysis technique. The pyrolysis is typically performed in oxygen-free conditions at a temperature of about 300 to 800° C. When slow heating rate is applied, the pyrolysis liquid, e.g. wood tar from dry wood, can typically be recovered in an amount of about 20 to 30% by weight. The amount of the pyrolysis liquids is increased when higher heating rates are applied. There are many known fast pyrolysis methods for producing pyrolysis products and chemicals.

Fast pyrolysis is typically carried out by heating the fuel to be pyrolyzed in a hot oxygen-free environment by introducing the required heat to the pyrolyzer by means of a heating gas, heat exchanger, heat transfer agent, e.g. sand or aluminum oxide based carrier, or catalyst. For example a bubbling or sand circulating fluidized-bed reactor may be used as the pyrolyzer. The produced pyrolysis vapor is typically condensed to a temperature of less than 100° C. in order to form the pyrolysis liquid.

The fuel to be pyrolyzed, e.g. biomass, is usually conducted to a dryer before the pyrolyzer for drying in order to reduce the water content of the pyrolysis liquid that is being formed. Typically drum, belt, flash or fluidized-bed dryers are used. It is also known to use a steam dryer in which the heat is introduced by means of hot sand to the dryer operating on the fluidized-bed basis and in which only water is removed. The temperature is kept at such level that organic compounds do not escape.

From WO 2009047392 is known an apparatus for producing a pyrolysis product in which a pyrolysis reactor and a boiler are integrated.

OBJECTIVE OF THE INVENTION

The objective of the invention is to disclose a new type method and apparatus for use in the production of a pyrolysis product.

SUMMARY OF THE INVENTION

The method and apparatus according to the invention is characterized by what has been presented in the claims.

The invention is based on a method for producing a pyrolysis product and for improving a pyrolysis, wherein raw material are fed to the pyrolysis reactor and gaseous pyrolysis product fractions and by-product fractions are formed from raw material by pyrolysis in a pyrolysis reactor. According to the invention, the method comprises at least steps: combusting at least one by-product fraction from the pyrolysis reactor in at least two combustors so that the by-product fraction is combusted in the first combustor and the flue gases from the first combustor is supplied to the second combustor in which the flue gases are combusted to form energy, and recovering energy formed in the combustor. Preferably, energy is recovered and utilized as heat in heating steam and/or water, e.g. feed water, without the recirculating of the recovered energy directly into the pyrolysis reactor.

Further, the invention is based on an apparatus for producing a pyrolysis product, and the apparatus comprises a pyrolysis reactor for forming gaseous pyrolysis product fractions and by-product fractions from raw material by pyrolysis, preferably by fast pyrolysis, and at least one equipment for feeding raw material to the pyrolysis reactor. According to the invention, the apparatus comprises at least two combustors in which at least one by-product fraction from the pyrolysis reactor is combusted; and means for recovering energy formed in the combustor.

In this context, the gaseous pyrolysis product fractions may refer to mixtures of gas, steam and/or aerosol.

In this context, the by-product fraction may include any components from the pyrolysis process, preferably no gaseous pyrolysis product components. The by-product fraction may include solid, liquid and gaseous components, e.g. by-products from pyrolysis, pyrolysis residue components, coke, catalyst, heat transfer material, bed sand or the like.

Any pyrolysis reactor known per se can be used in the pyrolysis. The pyrolysis reactor can be, for example, a fluidized-bed reactor, bubbling fluidization reactor or the like. In one embodiment, pyrolysis is a catalytic pyrolysis.

In one embodiment, the by-product fraction from the pyrolysis reactor is combusted, preferably by means of air, in two combustors so that the by-product fraction is partially combusted in the first combustor and the flue gases from the first combustor is supplied to the second combustor in which the flue gases are, preferably completely, combusted to form energy.

In one embodiment, the apparatus comprises two or more than two, preferably two, combustors in which the by-product fraction from the pyrolysis reactor is combusted by means of air to form flue gases. In one embodiment the by-product fraction is partially combusted to form flue gases in the first combustor and the flue gases are, preferably completely, combusted in the second combustor. Preferably, the energy, such as heat, from the flue gases is recovered. In one embodiment the apparatus comprises means for supplying air or oxygen to the combustor or combustors.

In one embodiment of the invention, the apparatus comprises means for monitoring and adjusting the temperature of the combustor. Preferably, the temperature is adjusted by means of the heated combustion air and/or heat exchanger.

In one embodiment, temperature is adjusted in the first combustor so that the temperature is preferably below 700° C., e.g. in connection with the catalytic pyrolysis. Preferably, the apparatus comprises an adjusting device for adjusting temperature in the first combustor so that the temperature is below 700° C. In the catalytic pyrolysis, the catalytic fraction may be circulated after the first combustor back to the pyrolysis and/or to the boiler, and the partially combusted flue gases are fed to the second combustor. The flue gases are preferably completely combusted in the second combustor. The catalytic fraction can be separated from the flow by any separator known per se.

In one embodiment, the apparatus comprises a boiler for forming energy fractions, such as hot water, hot steam and superheated steam. Preferably, the pyrolysis reactor is arranged in conjunction with the boiler. The apparatus comprises at least one equipment for feeding raw materials to the boiler. Any boiler known per se can be used as the boiler. The boiler can be any type of a boiler, such as bubbling or circulating fluidized bed boiler, grate or pulverized coal boiler.

In one embodiment, the energy recovered in the combustor is supplied as heat to the feed water, e.g. boiler feed water, and/or to the steam circuit of the boiler. In one embodiment, the apparatus comprises means for supplying energy recovered in the combustor to the feed water. In one embodiment, the apparatus comprises means for supplying energy recovered in the combustor to the steam circuit of the boiler.

In one embodiment, the apparatus comprises a heat exchanger for recovering heat energy from the flue gases, for example in connection with the second combustor. In one embodiment feed water and/or steam can be heated in said heat exchanger.

Preferably, the flue gases are combusted in the second combustion so efficiently that combustible residue gases are not substantially generated. In the second combustion water steam may be generated.

Further, the apparatus can comprise a condensing device for condensing gaseous pyrolysis product fractions to mainly liquid pyrolysis product fractions.

Further, the apparatus can comprise at least one separating device arranged substantially in conjunction with the pyrolysis reactor for separating other product fractions, such as solid and/or liquid fractions, from the gaseous pyrolysis product fractions after the pyrolysis. In one embodiment the apparatus comprises means for conducting at least part of the other fractions than the gaseous pyrolysis product fractions from the separator to the combustor as a by-product fraction. In one embodiment the apparatus comprises means for conducting at least part of the other fractions than the gaseous pyrolysis product fractions from the separator to the boiler. In one embodiment, the separating device is a cyclone, distiller, decanter, clearing basin, flotation device, centrifuge, other extractor or the like. In one embodiment, an integrated solution is used as the separating device, in which a combination of the conventional cyclone, impact separator and settling chamber is used for separating the coarse material and a full-feed cyclone, e.g. Cymic, Leka or the like, positioned in the inner tube of the cyclone, is used for separating the fine matter. In one embodiment, a two-phase separating device in which the separating cyclones are arranged within each other can be used as the separating device. Any known separating device suitable for the purpose may be used as the separating device.

In one embodiment the by-product fraction is conducted from the separating device to the combustor, preferably to the first combustor.

In one embodiment the side flow containing by-product fraction is conducted from the pyrolysis reactor to the combustor, preferably to the first combustor.

The fuel to be pyrolysed and fed to the pyrolysis reactor is preferably a wood-containing material, biomass and/or equivalent volatile materials containing organic material, e.g. sawdust, straw or waste plastic etc., which is pyrolyzed to gaseous pyrolysis product in the pyrolysis reactor.

Any solid fuel, e.g. forest chips, bark, peat or coal, or a multi-fuel mixture etc. which is burned in order to produce heat energy can be fed to the boiler which is primarily designed for producing heat energy, such as electricity and steam. In one embodiment, the boiler is provided with heat recovery.

In one embodiment, substantially different raw materials or mixtures of raw materials are fed to the boiler and the pyrolysis reactor. In one embodiment, at least partly the same raw materials or mixtures of raw materials are fed to the boiler and the pyrolysis reactor. Preferably, optimum fuel mixtures are fed to the boiler and the pyrolysis reactor in order to improve the efficiency of the combustion and pyrolysis and the yield of the pyrolysis product.

In one embodiment, the apparatus comprises a dryer in which the fuel to be pyrolyzed is dried thermally, preferably before the pyrolysis. Preferably, the dryer is integrated with the pyrolysis reactor and/or the boiler, and some of the heat energy that has been formed in the boiler is utilized when drying the fuel to be pyrolyzed. The fuel may be dried e.g. by the hot combustion gases or the hot heat transfer material or by utilizing the heat energy of the boiler. Of course, the drying may also be performed in other manners. Any dryer known per se, e.g. a low temperature dryer, such as a storage dryer, or the like, can be used as the dryer.

In one embodiment, the apparatus comprises means for feeding air or oxygen to the boiler.

In one embodiment of the invention, the apparatus comprises means for recovering, processing further, circulating in the apparatus and/or utilizing the fractions produced in different parts of the apparatus, such as the product, side and residual fractions and waste flow. In one embodiment, side, residual and/or waste flows are circulated to the boiler. In one embodiment, the non-condensible gases from the condensing device, other fractions than the gaseous product fractions after the pyrolysis, the combustion gas fraction, the refuse flow from the raw material feeding to the pyrolysis reactor and the solids from the condensing device can be conducted to the boiler. Preferably, heat transfer material if used in the process, can be circulated after the pyrolysis to the boiler and from the boiler back to the pyrolysis reactor.

The energy-containing product fractions from the boiler can be conducted to a desired part of the apparatus, e.g. the pyrolysis reactor, dryer, temperature raising and/or recovery. Some of the heat energy that has been recovered in the boiler can be utilized in the pyrolysis reactor e.g. by means of the heat transfer material that is heated in the boiler. From the boiler, the heated and at the same time purified heat transfer material is transferred, e.g. preferably at a temperature of 600 to 900° C., to the pyrolysis reactor, so that part of the heat energy formed in the boiler is transferred to the pyrolysis. The heat energy that is produced in the boiler can alternatively be recovered e.g. as steam, electricity or hot water. In one embodiment, the apparatus comprises means for separating the heat transfer material in a separating device and conducting it to the boiler to be purified and heated.

The pyrolysis product can be produced by the apparatus according to the invention with high efficiency.

The invention provides the advantage that the fast pyrolysis and boiler integration can be improved in industrial scale. The invention improves processability of the pyrolysis. Thanks to the invention pyrolysis by-products can be treated and utilized as energy with very high efficiency. Further, the invention is also suitable for catalytic pyrolysis.

The method and apparatus of the invention offers a possibility to produce the pyrolysis products cost-effectively with very high efficiency. The present invention provides an industrially applicable, simple and affordable way of producing pyrolysis products. The method and apparatus of the present invention is easy and simple to realize as a production process.

LIST OF FIGURES

In the following section, the invention will be described with the aid of detailed exemplary embodiments, referring to the accompanying FIGURE wherein FIG. 1 presents one embodiment of the apparatus according to the invention.

DETAILED DESCRIPTION OF THE INVENTION

FIG. 1 presents the apparatus according to the invention for producing pyrolysis products, the apparatus comprising a boiler 2, i.e. a fluidized bed boiler, for producing heat energy fractions 10 and 11, a fast pyrolysis reactor, i.e. a pyrolyzer, 1 for forming gaseous pyrolysis product 3 and by-product fractions 4 and 14, a condensing device 15 for condensing the gaseous pyrolysis product 3, and separate fuel feeding devices 5 and 6 for feeding raw material to the pyrolyzer 1 and the boiler 2. In addition, the apparatus comprises a cyclone 16 for separating the first by-product fraction 4, the second by-product fraction containing solids 14 and catalyst 13 from the gaseous pyrolysis product 3 after the pyrolyzer 1.

Most of the fuel, e.g. biomass, carbon, peat, lignite or oil shale, is fed by the feeding device 6 to the fluidized bed boiler 2. Furthermore, the feeding device 6 is arranged so that amounts of forest chips or bark can be fed to the boiler 2 as well. Also air 22 is fed to the fluidized bed boiler 2. The feeding device 5 is arranged to feed e.g. wood-containing material, biomass, such as peat, saw dust or straw, or organic material to the pyrolyzer 1.

In the pyrolyzer 1, gaseous pyrolysis product 3 is formed from the fuel to be pyrolyzed by fast pyrolysis at a temperature of 300 to 800° C. Further, by-product fractions 4 and 14 are generated in the pyrolysis. In this device embodiment, the pyrolyzer 1 is a circulating mass fluidization reactor. Heat transfer material 11, if used in the process, may be conducted from the fluidized bed boiler 2 to the pyrolyzer 1.

The apparatus comprises a cyclone 16 after the pyrolyzer 1. The first by-products 4 and pyrolysis residue/solids/carbon matter 14, e.g. sand, coke and tar, and catalyst 13 are separated from the produced gaseous pyrolysis products 3 in the cyclone 16. Separated components or a part of separated components 4, 13 and/or 14 can be circulated to a combustor 7. Alternatively the separated solids and carbon matter 14 or a part of them can be directly conducted to the boiler 2 to be burned. Further, the heat transfer material 11, if used in the process, may be separated in the cyclone 16 and conducted to the boiler 2. Alternatively, the heat transfer material 11 may be conducted from the cyclone 16 together with catalyst flow 13 to the combustor 7 and from the combustor 7 to the boiler 2 and/or pyrolyzer 1. In the boiler 2, the heat transfer material 11 can be regenerated and heated.

The apparatus comprises two combustors 7, 8 in which by-product fractions 4 and 14 from the pyrolysis reactor 1 is combusted. In the first combustor 7 the by-product fractions 4 and 14 containing also solids 14 and catalyst 13 are combusted partially to form flue gases 12. The flue gases 12 from the first combustor 7 are supplied to the second combustor 8. In the second combustor 8 the flue gases 12 are combusted completely to produce heat energy.

The apparatus comprises separator for separating the remaining solids and catalyst 13 from the flue gases 12 in connection with the first combustor 7. Further, the apparatus comprises means for conducting the remaining solids and separated catalyst 13 back to the pyrolysis reactor 1 and/or the boiler 2. From the boiler 2 catalyst 13 can be conducted to the pyrolysis reactor 1. Further, the apparatus comprises means for feeding air 18 to the combustors 7 and 8.

The apparatus comprises an adjusting device for adjusting temperature in the first combustor 7 so that the temperature is kept below 700° C.

Further, the apparatus comprises a heat exchanger 9 in connection with the second combustor 8 for recovering heat energy formed in the second combustor 8. Boiler feed water 17 or alternatively steam can be heated by means of heat energy in the heat exchanger 9.

From the cyclone 16, the gaseous pyrolysis product 3 is conducted to the condensing device 15, where the hot gaseous pyrolysis product 3 is condensed and fractionated in stages to a pyrolysis product liquid 20. Non-condensible gases, chemical compounds and/or aqueous solution 19 thereof can be conducted to the fluidized bed boiler 2 or pyrolyzer 1 or combustor 7 and/or 8 or to any other suitable process or device, e.g. gas turbine.

In addition, the apparatus may comprise a filter for separating finer solids from the gaseous pyrolysis product 3.

The apparatus may comprise a dryer for drying the raw material to be pyrolyzed. Either the combustion gas of the boiler or the heat transfer material conducted from the boiler may be utilized as the heat delivering agent in the dryer. Any dryer known per se, e.g. a mixing dryer, may be used as the dryer so it is not described in any more detail in this context.

The chemical compounds separated from different parts of the apparatus can be recovered for possible subsequent utilization. The chemical compounds are utilized by means of processes known per se which are not described in any more detail in this context.

By the apparatus according to the invention, the most valuable and suitable part of the raw material can be used as the material to be pyrolyzed, and the less suitable part in terms of the pyrolysis may be fed to the boiler. The raw material may be fractionated by processes known per se.

The method and apparatus according to the invention is suitable in different embodiments for producing different kinds of pyrolysis products.

The invention is not limited merely to the examples referred to above; instead many variations are possible within the scope of the inventive idea defined by the claims.

The invention claimed is:
1. A method for producing a pyrolysis product, in which raw material is fed to a pyrolysis reactor and gaseous pyrolysis product fractions and by-product fractions are formed from raw material by pyrolysis in the pyrolysis reactor, and the gaseous pyrolysis product fractions are condensed to liquid pyrolysis product fractions, where the method comprises the steps of:
combusting at least one by-product fraction comprising solid components from the pyrolysis reactor in at least two combustors so that the by-product fraction is partially combusted in a first combustor, solid components of the by-product fraction are recirculated back to the pyrolysis reactor, and the flue gases from the first combustor are supplied to a second combustor in which the flue gases are combusted to form energy; and
recovering energy formed in the second combustor.

2. The method according to claim 1, characterized in that temperature is adjusted in the first combustor so that the temperature is below 700° C.

3. The method according to claim 1, characterized in that the energy recovered in the second combustor is supplied to at least one of feed water and a steam circuit of a boiler.

* * * * *